United States Patent
Rahman et al.

(10) Patent No.: US 8,259,592 B2
(45) Date of Patent: Sep. 4, 2012

(54) IP MOBILITY FOR DEVICES WITH MULTIPLE RADIOS

(75) Inventors: Shamim A. Rahman, Montreal (CA); Catherine Livet, Montreal (CA); Guang Lu, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 181 days.

(21) Appl. No.: 12/483,502

(22) Filed: Jun. 12, 2009

(65) Prior Publication Data
US 2010/0054135 A1 Mar. 4, 2010

Related U.S. Application Data

(60) Provisional application No. 61/092,990, filed on Aug. 29, 2008.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. ....................................... 370/242
(58) Field of Classification Search ............. 370/216, 370/217, 225, 227, 228, 241, 242, 247, 248, 370/251
See application file for complete search history.

(56) References Cited

U.S. PATENT DOCUMENTS

| | | | | |
|---|---|---|---|---|
| 7,472,200 | B1 * | 12/2008 | Taylor et al. .................. | 709/238 |
| 7,483,984 | B1 | 1/2009 | Jonker et al. | |
| 2005/0198327 | A1 * | 9/2005 | Iwamura et al. .............. | 709/229 |
| 2006/0050628 | A1 * | 3/2006 | Ng et al. ........................ | 370/216 |
| 2006/0274750 | A1 * | 12/2006 | Babbar et al. ................. | 370/390 |
| 2007/0159977 | A1 * | 7/2007 | Dalal et al. .................... | 370/238 |
| 2010/0054135 | A1 * | 3/2010 | Rahman et al. ............... | 370/242 |

OTHER PUBLICATIONS

E. Nordmark et al., "Shim6: Level 3 Multihoming Shim Protocol for IPv6, draft-ietf-shim6-proto-10.txt", SHIM6 WG, Internet-Draft, (Feb. 14, 2008).

IEEE Computer Society, "Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Std 802.11—2007 (Revision of IEEE Std 802.11—1999), (Jun. 12, 2007).

(Continued)

*Primary Examiner* — Huy D Vu
*Assistant Examiner* — Adnan Baig
(74) *Attorney, Agent, or Firm* — Volpe and Koenig, P.C.

(57) ABSTRACT

A wireless transmit/receive unit (WTRU) includes a mobility management function and a multihoming function. The mobility management function may implement the Media Independent Handover (MIH) protocol and the multihoming function may implement the Shim6 protocol. The mobility management function may communicate link status information to the multihoming function. Based on the link status information, the multihoming function may accelerate or decelerate a link failure detection procedure, may modify a list of possible paths for consideration for a path exploration procedure, and/or may determine to initiate a path exploration procedure. The multihoming function may communicate to the mobility management function that additional communications resources are required. In response, the mobility management function may activate an inactive radio interface. Subsequent path exploration procedures may include the exploration of paths that may be established over the activated radio interface.

14 Claims, 8 Drawing Sheets

OTHER PUBLICATIONS

J. Arkko et al., "Failure Detection and Locator Pair Exploration Protocol for IPv6 Multihoming, draft-ietf-shim6-failure-detection-13", Network Working Group, Internet-Draft, Intended Status: Standards Track, (Jun. 24, 2008).
JH Choi, et al, "Goals of Detecting Network Attachment in IPv6", Network Working Group, Request for Comments: 4135, Category: Informational, (Aug. 2005).
LAN MAN Standards Committee of the IEEE Computer Society, "Draft Standard for Local and Metropolitan Area Networks: Media Independent Handover Services", IEEE P802.21/D12.0, (Jun. 2008).
M. Bagnulo et al, "Proxy Shim6 (P-Shim6), draft-bagnulo-pshim6-02", Network Working Group, Internet-Draft, Intended Status: Standards Track, (Feb. 22, 2008).
N. Montavot et al., "Analysis of Multihoming in Mobile IPv6, draft-ietf-monami6-mipv6-analysis-05", MEXT Working Group, Internet-Draft, Intended Status: Informational, (May 3, 2008).
R. Wakikawa et al., "Multiple Care-Of Addresses Registration, draft-ietf-monami6-multiplecoa-08.txt", MEXT Working Group, Internet-Draft, Intended Status: Standards Track, (May 30, 2008).
S. Krishnan et al., "Link-Layer Event Notifications for Detecting Network Attachments", Network Working Group, Request for Comments: 4957, Category: Informational, (Aug. 2007).
T. Ernst et al., "Motivations and Scenarios for Using Multiple Interfaces and Global Addresses, draft-ietf-monami6-multihoming-motivation-scenario-03.txt", Monami6 Working Group, Internet-Draft, (May 3, 2008).
Arkko et al., "Failure Detection and Locator Pair Exploration Protocol for IPv6 Multihoming, draft-ietf-shim6-failure-detection-13", Network Working Group, Internet-Draft, Intended Status: Standards Track, (Jun. 24, 2008).
Bagnulo et al, "Proxy Shim6 (P-Shim6), draft-bagnulo-pshim6-02", Network Working Group, Internet-Draft, Intended Status: Standards Track, (Feb. 22, 2008).
Chen et al., "SCTP-Based Handoff Based on MIH Triggers Information in Campus Networks," IEEE $8^{th}$ International Conference on Advanced Communication Technology, pp. 1297-1301 (Feb. 2006).
Choi, et al, "Goals of Detecting Network Attachment in IPv6", Network Working Group, Request for Comments: 4135, Category: Informational, (Aug. 2005).
Ernst et al., "Motivations and Scenarios for Using Multiple Interfaces and Global Addresses, draft-ietf-monami6-multihoming-motivation-scenario-03.txt", Monami6 Working Group, Internet-Draft, (May 3, 2008).
Huang et al., The Handover Control Mechanism for Multi-Path Transmission using Stream Control Transmission Protocol (SCTP), Computer Communications, vol. 30, No. 17, Elsevier Science Publishers, pp. 3239-3256 (Nov. 2007).
Krishnan et al., "Link-Layer Event Notifications for Detecting Network Attachments", Network Working Group, Request for Comments: 4957, Category: Informational, (Aug. 2007).
Montavot et al., "Analysis of Multihoming in Mobile IPv6, draft-ietf-monami6-mipv6-analysis-05", MEXT Working Group, Internet-Draft, Intended Status: Informational, (May 3, 2008).
Nordmark et al., "Shim6: Level 3 Multihoming Shim Protocol for IPv6, draft-ietf-shim6-proto-10.txt", SHIM6 WG, Internet-Draft, (Feb. 14, 2008).
Wakikawa et al., "Multiple Care-Of Addresses Registration, draft-ietf-monami6-multiplecoa-08.txt", MEXT Working Group, Internet-Draft, Intended Status: Standards Track, (May 30, 2008).

* cited by examiner

IP MOBILITY FOR DEVICES WITH MULTIPLE RADIOS

CROSS REFERENCE TO RELATED APPLICATION

This application claims the benefit of U.S. Provisional Application No. 61/092,990, filed on Aug. 29, 2008, which is incorporated by reference as if fully set forth.

TECHNICAL FIELD

The current disclosure relates to wireless communications.

BACKGROUND

Multihoming is the configuration of multiple Internet Protocol (IP) addresses on a device participating in an IP network. Multihoming may be accomplished through different approaches, including assigning multiple IP addresses to a single link and employing multiple physical interfaces with distinct IP addresses. Multihoming may be used to split data into parallel streams, so as to increase throughput and reliability. For example, a data stream may be received at a host over three parallel streams over three distinct IP addresses over three distinct links. The received data may then be recombined at the host.

In the context of IP version 6 (IPv6), the Internet Engineering Task Force (IETF) Shim6 protocol may be employed to facilitate multihoming. Shim 6 is host-based, and offers features such as the ability to manage several IP paths, failure detection and recovery, and best path selection. In IP version 4 (IPv4) multihoming, address prefixes were required, which increased the size of routing tables and, consequently, the time required to deliver packets. Using Shim6 and IPv6, the address prefixes are not required, thereby avoiding the performance delays of IPv4 multihoming.

Shim6 works by modifying the network layer in the protocol stack. When two hosts using Shim6 connect, they establish a Shim6 context and exchange information including the multiple IPv6 addresses with which they may be reached. During transmission of a packet, the packet is received at the network layer in the transmitting host from a higher layer with a destination IP address of the intended recipient host. The Shim6 element in the network layer may substitute a different IP address for the destination host, and then communicate the packet up to the transport layer. This substitution may be performed if, for example, the destination IP address originally indicated in the packet identifies a link to the destination host that is no longer viable. This allows for the new path to be used without breaking current transport-layer configurations. In Shim6, the IP addresses revealed to the transport layer are referred to as "identifiers," while the IP address revealed to the network and data link layers are referred to as "locators." The Shim6 element stores mappings between identifiers and locators in order to facilitate path selection.

FIG. 1 shows an example of two hosts configured to communicate using Shim6. In State A 150, Host A 190 and Host B 192 configured to communicate using a first link 120. Using Shim6, Host A 190 and Host B 192 can transition to State B 152, where Host A 190 and Host B 192 communicate using a second link 130. Host A 190 is connected to two Internet Service Providers (ISPs), ISP1 102 and ISP2 104. Host A 190 is multihomed, and is allocated a first IP address (ISP1.A) by ISP1 102 and a second IP address (ISP2.A) by ISP2 104. Host A 190 is connected to the Internet 106 via ISP1 102 and ISP2 104. Host B 192 is connected to ISP3 108, and is connected via ISP3 108 to the Internet 106. Host B 192 is allocated an IP address (ISP3.B) by ISP3 108. In State A 150, Host A 190 and Host B 192 communicate using link 120, which operates through ISP1 102 and ISP3 108. At State A 150, the network layer in the protocol stack at Host B 192 may receive packets from the transport layer addressed to Host A 190 at either the ISP1.A or the ISP2.A address. If the packet is addressed to ISP2.A, the Shim6 layer at Host B 192 may decide to change the packet headers to indicate that the destination is ISP1.A, and may pass the modified packets to the data link layer for communication over the first link 120. The transport layer at Host B 192 is unaware of which address is used to actually communicate the packets to Host A 190, as this is handled by the Shim6 sub-layer. If the first link 120 becomes unusable, Host A 190 and Host B 190 transition to State B 152 and communicate using a second link 130. At State B 152, the network layer in the protocol stack at Host B 192 may receive packets addressed to Host A 190 at either ISP1.A or ISP2.A. If the packet is addressed to ISP1.A, the Shim6 layer at Host B 192 will re-address the headers to ISP2.A. The transition from State A 150 to State B 192 does not require reconfiguration of transport layer resources at either Host A 190 or Host B 192, as operation of the transport layer is unaffected by the transition. Procedures provided by Shim6 for detecting link failure and for performing transitions between links (such as the transition between State A 150 and State B 152) are described in detail below with reference to FIGS. 2 and 3.

Shim6 defines a Forced Bidirectional Detection (FBD) procedure for detecting link failure. FBD is used to determine the viability (or "reachability") of a used IP address pair between two hosts. Reachability is analyzed in terms of reciprocal traffic; traffic in one direction creates an expectation of traffic in the return direction. The FBD procedure begins after two nodes have successfully established a Shim6 context. A node which implements FBD uses two timers: (1) a send timer to indicate the time since the last packet was sent, and (2) a keepalive timer to indicate the time since the last packet was received. These two timers are mutually exclusive, so that no more than one timer is running at any time. When a host generates an outgoing data packet within the Shim6 context, the send timer is started. If there is a keepalive timer running at the time, the keepalive timer is stopped. When the host receives an incoming data packet, the send timer is stopped and the keepalive timer is started. If the keepalive timer exceeds a keepalive timeout value, a keepalive packet is transmitted to the other host. If the send timer value exceeds a send timeout value, the host determines that the other host is unreachable. Using FBD, it may take the host tens of seconds to determine if the other host is unreachable.

FIG. 2 is a signal diagram showing the FBD procedure. Host A 290 and Host B 292 have established a Shim6 context. Host A starts 202 its send timer and transmits 204 a data packet to Host B 292. Host B 292 starts 206 its send timer and transmits 208 a data packet to Host A. In response to receiving the data packet, Host A 290 stops 210 its send timer and starts its keepalive timer. The keepalive timer of Host A 290 expires 212, and Host A 290 starts 212 its send timer and sends 214 a keepalive packet to Host B 292. In response to the keepalive packet, Host B 292 stops 216 its send timer. Host B 292 starts 218 its send timer and sends 220 a data or keepalive packet to Host A 290. In response to receiving the data or keepalive packet, Host A stops 222 its send timer. At this point, both Host A 290 and Host B 292 determine that the link over which they have been communicating is viable.

Host A 290 then starts 224 its send timer and sends 226 a data or keepalive packet 226. The data or keepalive packet does not reach Host B 292. The send timer of Host B 292 expires 228, indicating a failure of the link to Host A 290. The send timer of Host A 290 expires 232, indicating a failure of the link to Host B 292. At this point, both Host A and Host B have determined that the link over which they have been communicating is broken.

Shim6 further defines the Locator Pair Exploration procedure, which is used by hosts to explore a viable link when they experience link failure. According to the Locator Pair Exploration procedure, the host that first detects a link failure sends probe messages to the other host using different address pairs. The host iterates through address pair combinations until it receives a probe message back. The responding probe message confirms that the initial probe message has reached the other host, and that the link is functional in both directions.

FIG. 3 is a signal diagram showing the Locator Pair Exploration procedure. At Host B 392, the send timer expires 302, indicating a failure on the link being used to communicate between Host A 390 and Host B 392. Host B 392 then sends 304 a probe request on the link defined by the IP address pair (B1, A1). The probe request includes a field indicating an "exploring" state. The probe request does not reach Host A 390. Host B 392 then sends 306 a probe on the link (B2, A1). The probe does not reach Host B 390. Host B 392 then sends 308 a probe request to Host A 390 on the link (B2, A2). This probe reaches Host A and is received by Host A. In response to receiving the probe, Host A 390 sends 310 a return probe on link (A2, B2). The return probe has a filed indicating a state of "inboundok." The return probe reaches Host B and is received by Host B. In response to the return probe, Host B 392 sends 312 a probe with a state of "operational" to Host A. The "operational" probe reaches Host A 390 and is received by Host A. At this time, Host A 390 and Host B 392 have established a viable link using the IP address pair (B2, A2). Host A may then send 314 a data packet to Host B on link (A2, B2).

Institute of Electrical and Electronics Engineers (IEEE) 802.21 MIH (Media Independent Handover) defines a framework for supporting mobility of devices between networks based on heterogeneous link layer (layer one and layer two) technologies. MIH defines mechanisms for handover and link adaptation in response to changing link conditions and quality of service (QoS) requirements. MIH specifies an MIH Function (MIHF), which is an implementation of MIH services and is treated as a logical entity implemented in both MIH devices and in the network.

FIG. 4 shows an example protocol stack 450 that includes an MIHF 400. The MIHF 400 implements three MIH services: the Media Independent Event Service, the Media Independent Information Service (MIIS), and the Media Independent Command Service (MICS). The Media Independent Event service relates to the notification of events such as physical, data link and logical link layers state changes and establishment and tearing down of links. The MIHF provides these services to the MIH Users 404, which are upper layer (layer three and above) entities.

The protocol stack 450 includes a first link layer component 420 that implements media-specific link layer functionality according to a first radio access technology (RAT). A second link layer component 430 implements media-specific link layer functionality according to a second RAT. As an example, the first link layer component 420 may function according to IEEE 802.11 Wireless Local Area Network (WLAN) standards, while the second link layer component 430 may function according to Third Generation Partnership Project (3GPP) Evolved Universal Terrestrial Radio Access Network (E-UTRAN) standards.

In MIH, exchanges of information between functional entities occur via Service Access Points (SAPs). The MIH Users 404 may communicate with the first link layer component 420 via a first Logical Link Control (LLC) SAP 406 and with the second link layer component 430 via a second LLC_SAP 408. The MIHF 400 and the MIH Users 404 communicate using MIH_SAP 402. The MIHF 400 and the first link layer component 420 communicate via MIH_LINK_SAP 410. The MIHF 400 and the second link layer component 430 communicate via MIH_LINK_SAP 418. Each MIH_LINK_SAP 410, 418 may be implemented as a media-specific Media Access Control (MAC) SAP, physical layer (PHY) SAP, and/or Logical Link Control (LLC) SAP.

The first link layer component 420 may notify the MIHF 400 of a change in MAC or PHY state via the MIH_LINK_SAP 410, and the MIHF 400 may subsequently communicate a notification of the event to the MIH Users 404 via the MIH_SAP 402. The MIHF 400 may additionally communicate with remote MIHFs (not depicted) via a network SAP (MIH_NET_SAP) and receive event notifications from the remote MIHFs regarding, for example, the detection of new access networks and link QoS information.

The purpose of the MIIS is to acquire a global view of available networks to facilitate network selection and handovers. The MIIS provides a mechanism for the exchange of information between MIH devices and MIH-capable networks regarding handover candidates. MIIS information may be communicated in both directions on the MIH_SAP 402 as well as in both directions on the MIH_LINK_SAPs 410, 418.

The MICS allows for the initiation of handover between links. Using the MICS, handover commands are received at the MIHF 400 from MIH Users 404 via the MIH_SAP 402. In response to a handover command, the MIHF 400 may issue a command to control lower layer entities. For example, the MIHF 400 may communicate with the first link layer component 420 and the second link layer component 430 in order to handover the protocol stack 450 from one network to another.

While current technologies such as MIH and Shim6 provide mechanisms for improving the connectivity of networking devices, current technologies leave a number of issues unaddressed. Current power-saving techniques for single- and dual-mode wireless devices determine when radio interfaces are turned on and off based on parameters such as link quality and required QoS. However, these techniques do not suggest how power-saving techniques may implemented in multimode, multihoming devices. Additionally, current technologies do not suggest how handover should be performed for multimode, multihoming devices. For example, current technologies do not provide solutions that consider both access network characteristics and multihoming IP path characteristics in making handover decisions. Therefore, technologies for power-saving and IP link/access network mobility in the context of wireless devices with multiple radio interfaces are required.

SUMMARY

A wireless transmit/receive unit (WTRU) includes a mobility management function and a multihoming function. The mobility management function may implement the Media Independent Handover (MIH) protocol and the multihoming function may implement the Shim6 protocol. The mobility management function may communicate link status information to the multihoming function. Based on the link status information, the multihoming function may accelerate or decelerate a link failure detection procedure, may modify a list of possible paths for consideration for a path exploration procedure, and/or may determine to initiate a path exploration procedure. The multihoming function may communicate to the mobility management function that additional communications resources are required. In response, the mobility management function may activate an inactive radio interface. Subsequent path exploration procedures may include the exploration of paths that may be established over the activated radio interface.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "link layer component" is a component that implements layer one and/or layer two functionality according to a Radio Access Technology (RAT). When referred to hereafter, the terminology "base station" includes but is not limited to a Node-B, a site controller, an access point (AP), or any other type of interfacing device capable of operating in a wireless environment.

When referred to hereafter, a "multihoming function" is a module that implements at least some subset of multihoming functionality. Multihoming functionality includes but is not limited to: maintaining a single IP address that corresponds to multiple physical interfaces; maintaining multiple IP addresses that correspond to multiple IP paths; generating and storing IP address pairs that identifying IP paths for multihomed use; detecting link quality (including failure) over multihomed IP links; exploration for pairs of IP addresses for multihomed IP links; inter-domain handover of multihomed IP sessions; and translation/mapping of IP addresses to deliver payload data over multihomed IP links. A Shim6 implementation is one example of a multihoming function, though the principles described herein are not limited to use with Shim6.

When referred to hereafter, a "mobility management function" is a module that implements at least some subset of mobility management functionality. Mobility management functionality includes but is not limited to: receiving, generating, and/or storing information relating to available heterogeneous access networks, their attributes, and/or link status over the access networks; and providing commands to heterogeneous link layer components to perform handover and/or turn radio interfaces on or off. A Media Independent Handover (MIH) Function (MIHF) is one example of a mobility management function, though the principles described herein are not limited to the use of MIH or the MIHF.

Figure 1:
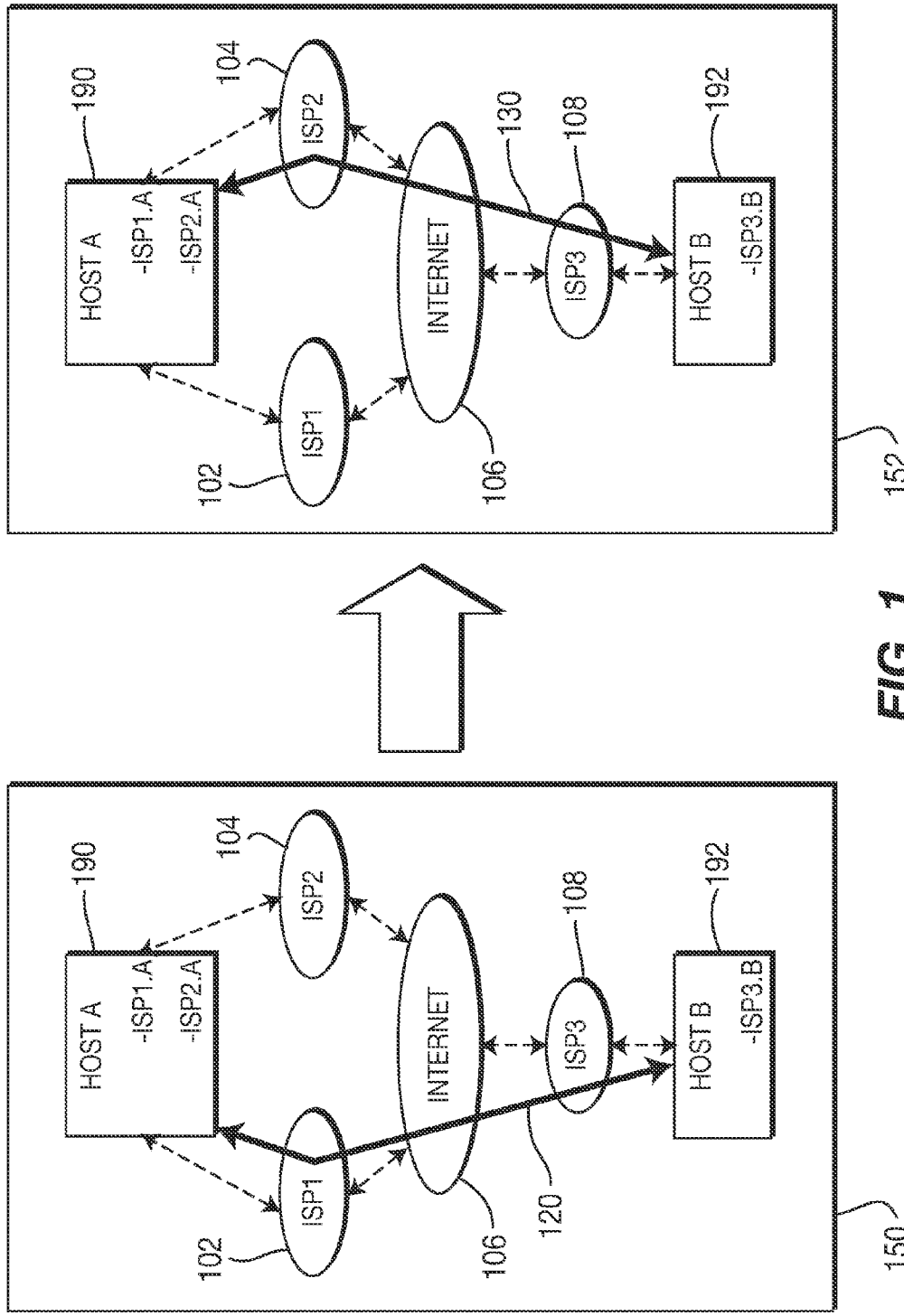
FIG. 1 shows an example of switching between IP links using Shim6.
Figure 2:
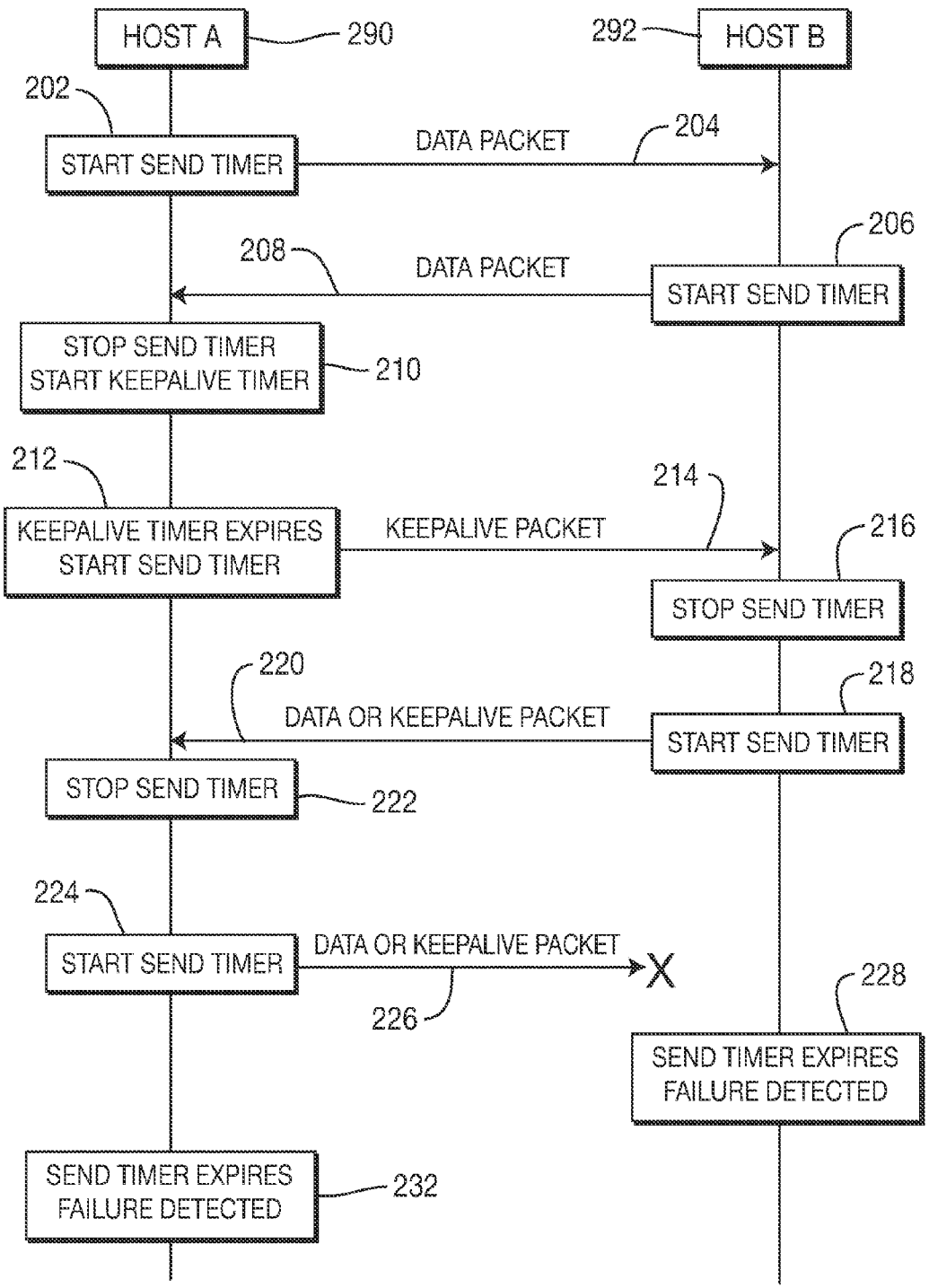
FIG. 2 is a signal diagram showing the Shim6 Forced Bidirectional Detection (FBD) procedure for detecting link failure.
Figure 3:
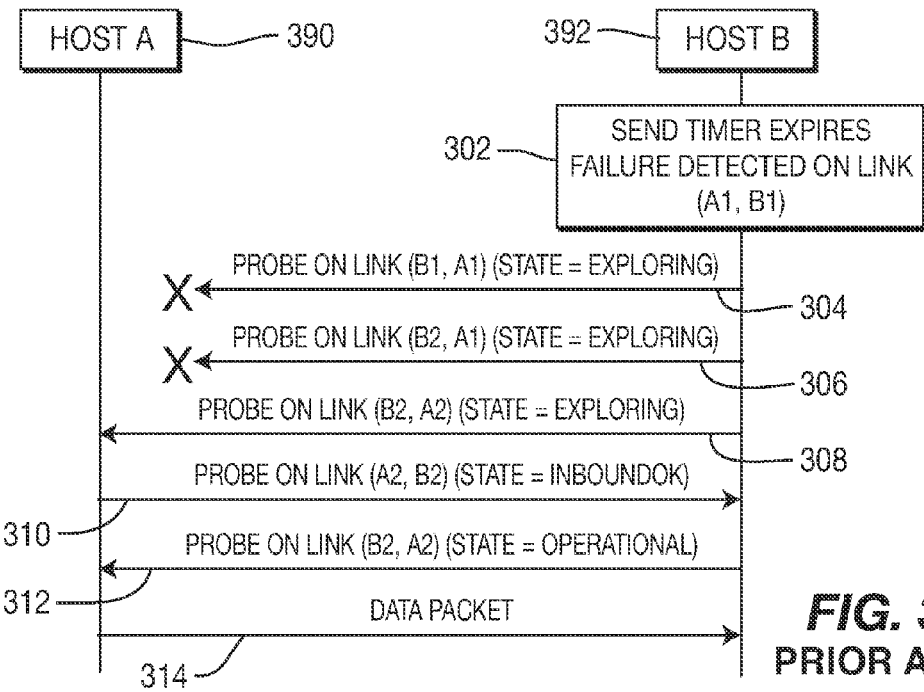
FIG. 3 is a signal diagram showing the Shim6 Locator Pair Exploration procedure for exploration of IP paths.
Figure 4:
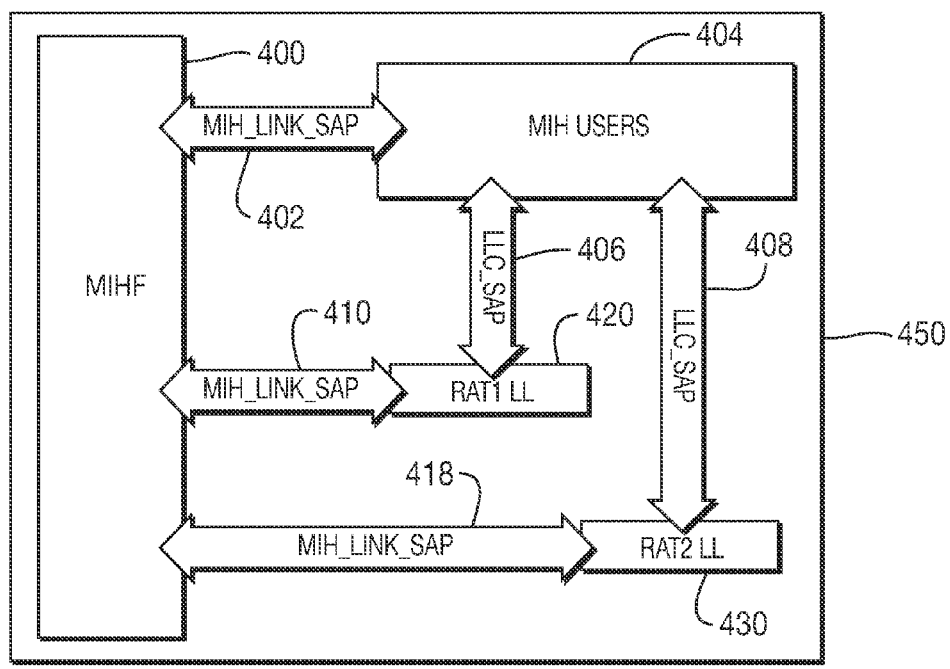
FIG. 4 shows an example network protocol stack that includes a Media Independent Handover (MIH) Function (MIHF)
Figure 5:
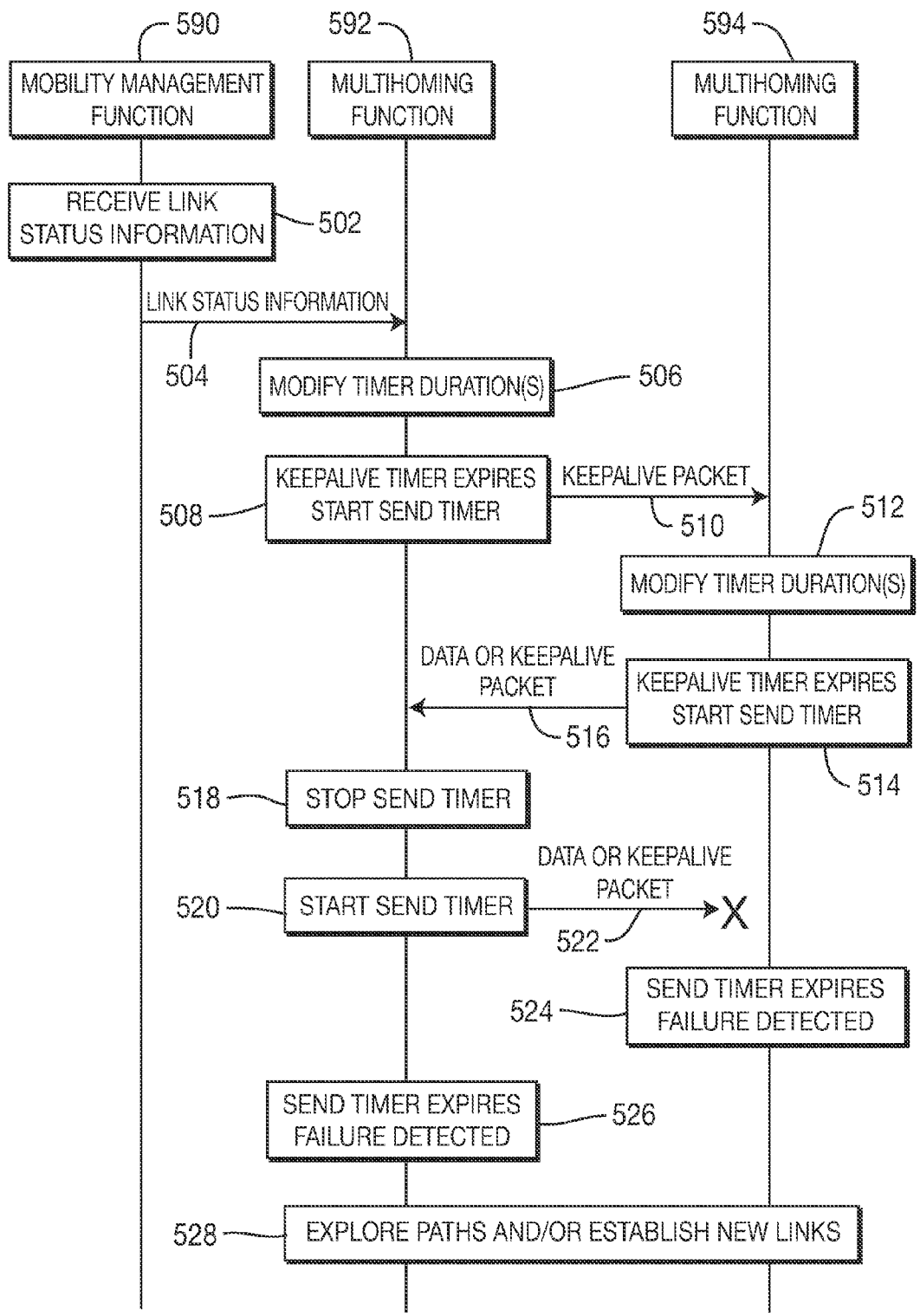
FIG. 5 is a signal diagram showing the acceleration of a failure detection procedure based on link status information communicated from a mobility management function to a multihoming function.

FIG. 5 is a signal diagram showing the modification of failure detection timers based on link status information. FIG. 5 shows a mobility management function (MMF) 590 and a first multihoming function (MHF) 592 implemented in a WTRU. FIG. 5 additionally shows a second multihoming function 594 implemented on a second device which may be a WTRU or non-wireless networking device. The MMF 590 receives 502 link status information relating to a currently active link. The link status information may indicate that link conditions are degrading and/or that that connectivity on the link may be lost. The link status information may also indicate a high confidence or low confidence that connectivity on the link will be lost. The MMF 590 communicates 504 the link status information to the first MHF 592.

The first MHF 592 modifies 506 the durations of one or more timer parameters used in link failure detection based on the contents of the received link status information. For example, the first MHF 592 may modify 506 the durations of keepalive or send timer parameters. The first MHF 592 may modify one or more of the durations by an amount proportional to the confidence that connectivity on the link will be lost. For example, if the link status information indicates a low confidence that connectivity will be lost, the keepalive timer duration may be set to be half of its previous duration. If the link status information indicates a high confidence that connectivity will be lost, the keepalive timer may be stopped or its duration set to zero, such that a keepalive message will be sent immediately.

The keepalive timer at the first MHF 592 expires 508 based on the modified duration, the send timer is started 508, and the first MHF 592 sends 510 a keepalive packet to the second MHF 594. The 510 keepalive packet can carry an indication of poor link quality to inform the second MHF 594 about the link quality. The second MHF 594 may modify 512 the timer durations of one or more link failure detection timers, such as the keepalive or send timers based on receiving 510 the keepalive packet at a time earlier than expected. Alternatively or additionally, the second MHF 594 may modify 512 the timer durations based on link status information received from an MMF (not depicted) implemented in the second device.

The keepalive timer at the second MHF 594 expires 514 based on the modified duration, the send timer is started 514, and the second MHF 594 sends 516 a data or keepalive packet to the first MHF 592. In response to the data or keepalive packet, the first MHF 592 stops 518 its send timer. The first MHF 592 sends 522 a data or keepalive packet and starts 520 its send timer, though the data or keepalive packet does not reach the second MHF 594. The send timer (based on a modified duration) at the second MHF 594 expires 524, indicating link failure. The send timer (based on a modified duration) at the first MHF 592 expires 526, indicating link failure. After link failure is detected, the first MHF 592 and second MHF 594 may perform 528 a procedure to explore paths and/or establish a new link. The procedure to explore paths and/or establish a new link may be, for example, a Locator Pair Exploration procedure.

As described above, timer durations may be modified 506, 512 to be shortened where unfavorable link status information is received. Timer durations may alternatively or additionally be modified to be longer when favorable link status information is received from an MMF or when a keepalive timer is received at a time later than expected. Adjusting the duration of a failure detection timer based on link status input from an MMF has the effect of making link failure detection faster or slower, depending upon whether the duration is set to be longer or shorter.

Figure 6:
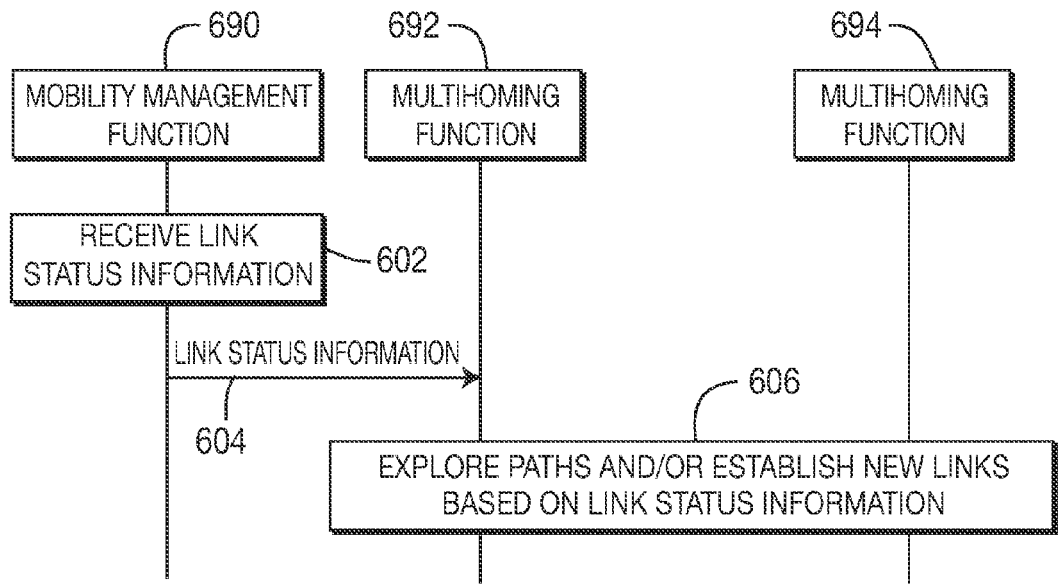
FIG. 6 is a signal diagram showing performance of a path exploration/link establishment procedure based on link status information communicated from a mobility management function to a multihoming function.

FIG. 6 is a signal diagram showing a first MHF 692 performing 606 a path exploration and/or link establishment procedure based on link status information received from an MMF 690. FIG. 6 shows an MMF 690 and a first MHF 692 implemented in a WTRU. FIG. 6 additionally shows a second MHF 694 implemented on a second device which may be a WTRU or non-wireless networking device.

The MMF 690 receives 602 link status information, and communicates 604 the link status information to the first MHF 692. The link status information may indicate, for example, the discovery of new links, the destruction of links, and/or additional information such as link quality, QoS, and link data rates. The first MHF 692 may maintain information relating to potential link candidates. The link candidate information may be stored in a list, set, or any other appropriate data structure. By way of example, the first MHF 692 may store information indicating three IP addresses {IP_A, IP_B, and IP_C} with which it may potentially communicate with the second device that includes the second MHF 694. If the first MHF 692 receives 604 link status information indicating that the link corresponding to IP_A is down, then the first MHF 692 may modify its link candidate information to reflect that IP_A should not be considered a candidate for path exploration/link establishment. If the first MHF 692 receives link status information indicating that the link corresponding to IP_B has poor quality, then the first MHF 692 would consider IP_B a less desirable candidate for path exploration/link establishment, and would downgrade the desirability of IP_B as a candidate. If the first MHF 692 maintains an ordered list of candidates, the first MHF 692 may re-order the list such that other candidates with more favorable corresponding link quality information are selected before IP_B is selected.

The first MHF 692 and second MHF 694 perform 606 a path exploration/link establishment procedure based on the modified candidate information. The procedure to explore paths and/or establish a new link may be, for example, a Locator Pair Exploration procedure. Based on the above example involving {IP_A, IP_B, and IP_C}, the first MHF 692 may perform 606 the path exploration/link establishment procedure by sending a first probe request to the second MHF 694 via IP_C. Only if path exploration using IP_C proved unsuccessful would the first MHF 692 attempt to explore a path using IP_B. The first MHF 692 would not attempt to send a probe request using IP_A because IP_A was removed from the list of potential candidates based on the link status information.

The first MHF 692 may additionally trigger a path exploration/link establishment procedure based on the received link status information. For example, link status information may indicate that a link considered currently active is down. Based on the link status information, the first MHF 692 may make a determination to immediately abandon the current link and establish a new link. Whereas the first MHF 692 may ordinarily wait until the completion of a link failure detection procedure before searching for a new link, the first MHF 692 may in this instance halt or ignore any failure detection procedures currently in progress in order to immediately begin working towards establishing a new link.

The first MHF 692 may also determine to initiate a path exploration/link establishment procedure in response to receiving 604 link status information that indicates that a new link has been detected or that a previously-discovered link is available for use. This determination may additionally be based on previously-received link status information such as, for example, information indicating a poor current link status.

Figure 7:
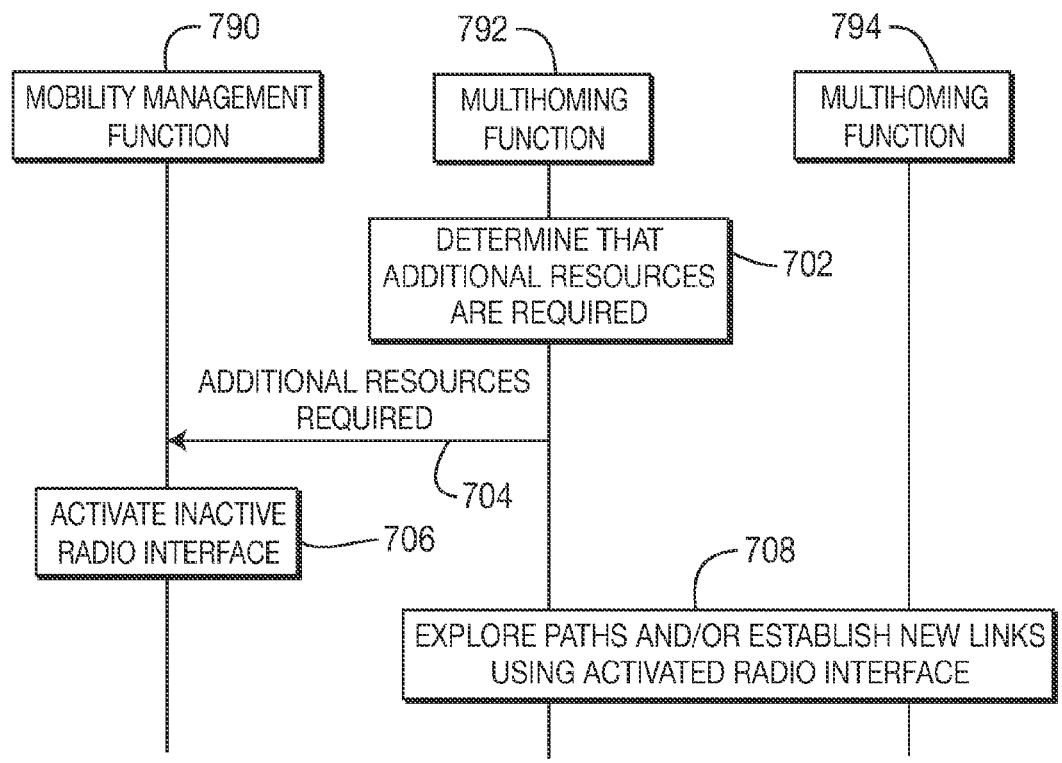
FIG. 7 is a signal diagram showing the activation of a radio interface by a mobility management function based on information received from a multihoming function.

FIG. 7 shows an MMF 790 activating 706 an inactive radio based on a resource requirement message received from a first MHF 792. The MMF 790 and first MHF 792 are implemented in a WTRU. A second MHF 794 is implemented on a second device which may be a WTRU or non-wireless networking device. The first MHF 792 determines 702 that additional communication resources are required. For example, this may be a determination that bandwidth on a link should be increased, that a new IP address is required, that a new interface is required, or may be a determination that current conditions do not support a new QoS requirement. The first MHF 792 communicates 704 a resource requirement message to the MMF 790 indicating that additional communication resources are required. Alternatively or additionally, the resource requirement message may be a command or request for additional communication resources. In response, the MMF 790 may choose to activate 706 a radio in the WTRU which is currently inactive, so that the radio may be use for subsequent communications. A new radio interface may be activated 706 by using, for example, MIH messages or primitives sent via an MIH_LINK_SAP. The first MHF 792 and second MHF 794 may perform 708 a procedure for path exploration and/or link establishment, and paths which are available over the newly activated radio may be considered as candidates. The procedure for path exploration/link establishment may be, for example, a Locator Pair Exploration procedure.

Figure 8:
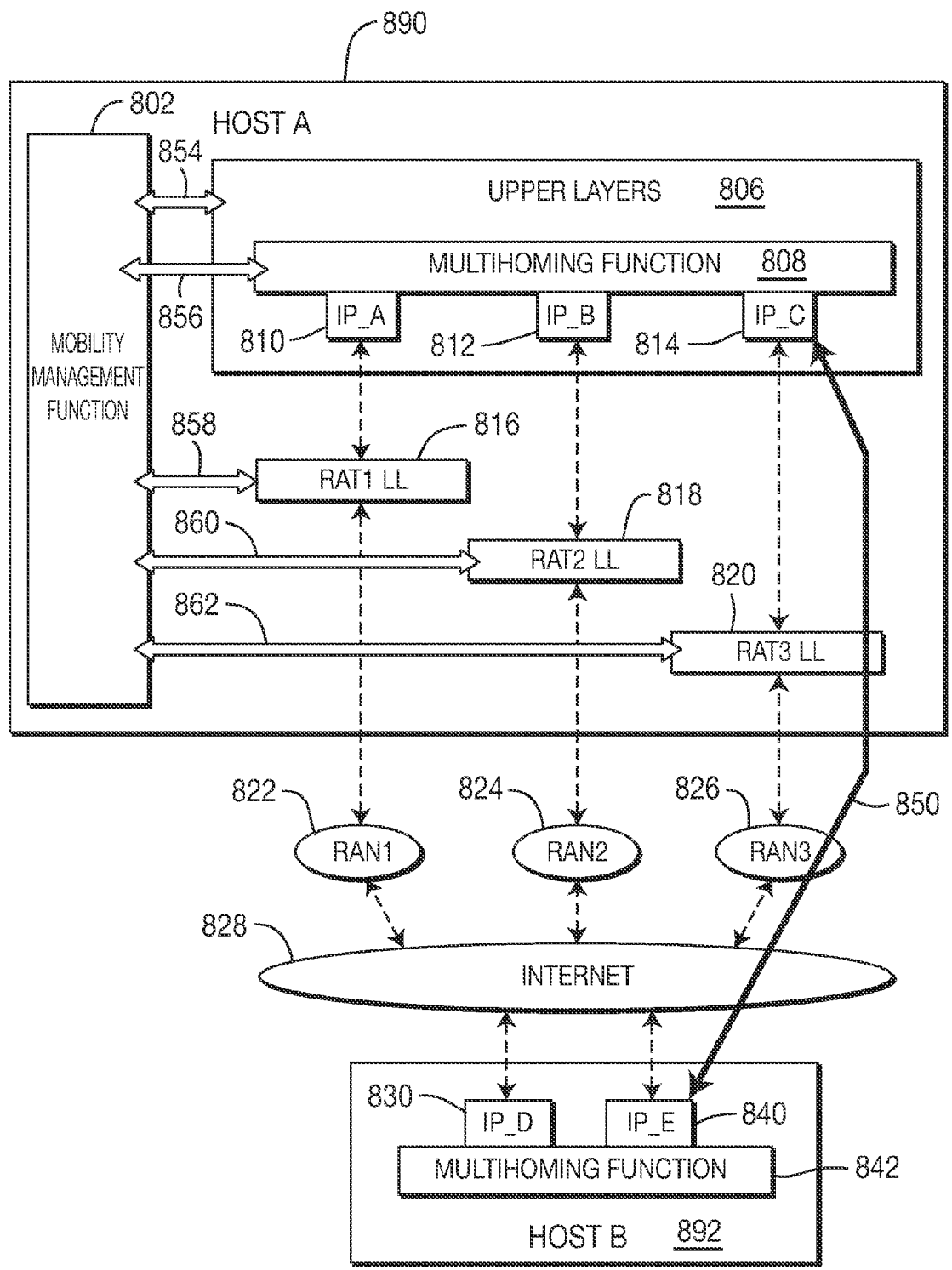
FIG. 8 shows an example architecture for a wireless transmit/receive unit (WTRU) including mobility management function and a multihoming function.

FIG. 8 shows an example architecture for a WTRU ("Host A") 890 incorporating an MMF 802 and a first MHF 808. The WTRU 890 is configurable to implement the methods and features described above with reference to FIGS. 5-7. The WTRU 890 includes MMF 802 which communicates with the first MHF 808 via direct interface 856. The first MHF 808 is included in upper layer block 806. Upper layer block 806 includes entities at layer three or above, including at the network, transport, session, presentation, and/or application layers. The upper layer block 806 may include one or more MIH User entities (not depicted). The MMF 802 may additionally communicate with the upper layer block 806 via interface 854. Interface 854 may be a media-independent interface and may be, for example, an MIH_SAP interface for communicating with MIH Users.

The WTRU 890 includes a first link layer component 816, which implements link layer functionality according to a first RAT. The first link layer component 816 may communicate with a first radio access network 822 which operates according to the first RAT. A second link layer component 818 implements link layer functionality according to a second RAT, and may communicate with second radio access network 824, which operates according to the second RAT. A third link layer component 820 implements link layer functionality according to a third RAT, and may communicate with a third radio access network 826, which operates according to the third RAT. The MMF 802 communicates with the link layer components 816, 818, 820 via interfaces 858, 860, 862. The interfaces 858, 860, 862 may be media dependent interfaces, and may be, for example, MIH_LINK_SAP interfaces. Each of the RATs supported by the link layer link layer components 816, 818, 820 may be different. The WTRU 890 may also include additional link layer link layer components (not depicted).

The first MHF 808 in the WTRU 890 maintains a first IP address 810 ("IP_A"), second IP address 812 ("IP_B"), and third IP address 814 ("IP_C") for the WTRU 890. The first MHF 808 may establish IP links over IP paths from each of the IP addresses 810, 812, 814, through corresponding link layer link layer components 816, 818, 820 and radio access networks 822, 824, 826.

The WTRU 890 is in communication with Host B 892 through active IP link 850, which connects the WTRU 890 and Host B 892 via the Internet 828. Host B 892 may be a WTRU or a non-wireless networking device. Host B includes a second MHF 842. The second MHF 842 maintains a fourth IP address 830 ("IP_D") and a fifth IP address 840 ("IP_E") for Host B 892. From the perspective of the first MHF 808 in the WTRU 890, the active IP link 850 would be characterized as (IP_C, IP_E), while the active IP link 850 would be characterized by the second MHF 842 in Host B 892 as (IP_E, IP_C).

Figure 9:
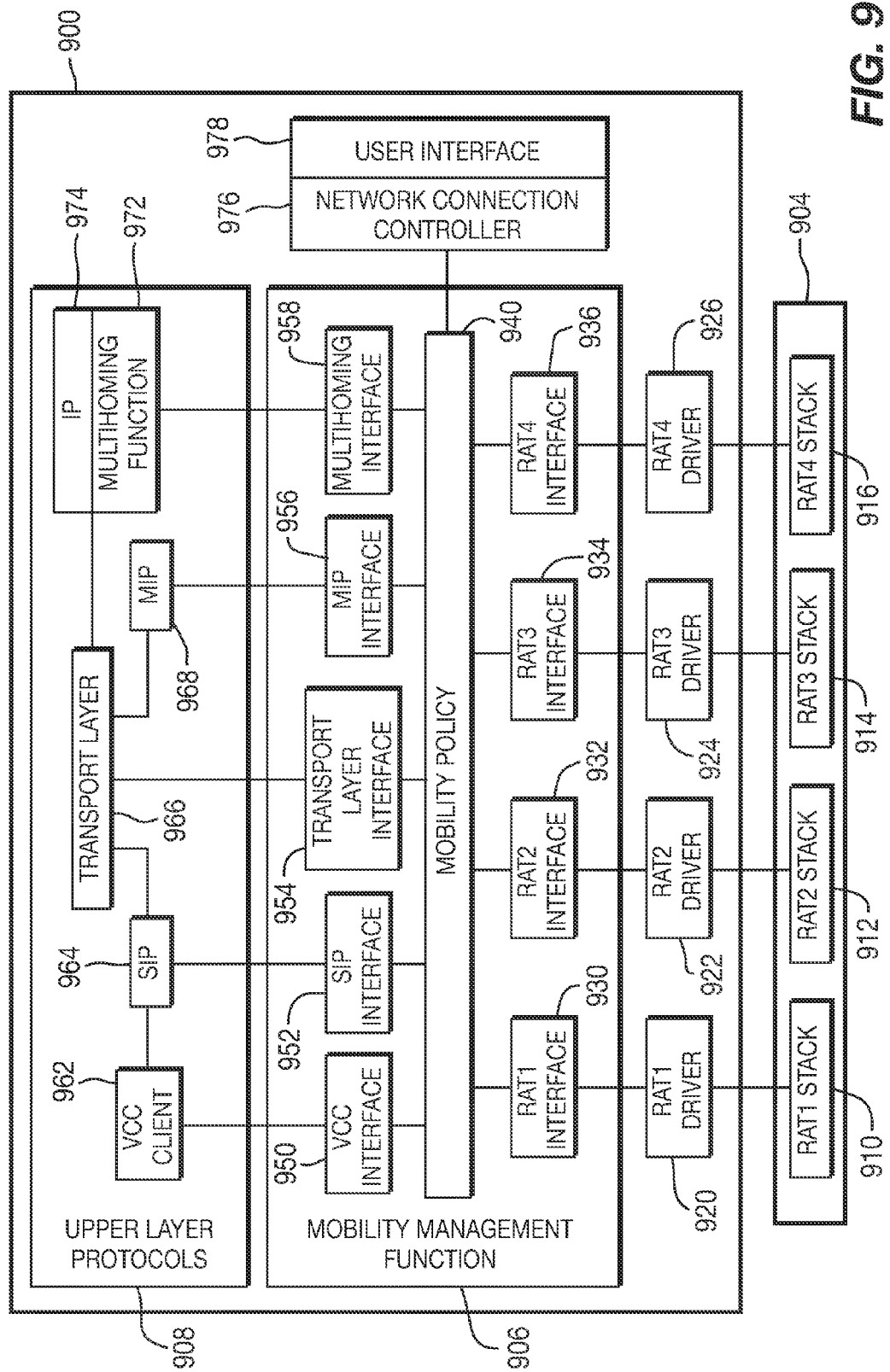
FIG. 9 shows an example software architecture for a WTRU that includes a mobility management function and a multihoming function.

FIG. 9 shows an example software architecture for a WTRU 900 that includes an MMF 906 in communication with an MHF 972. The WTRU 900 is configurable to implement the methods and features described above with reference to FIGS. 5-8. Radio access component 904 includes four RAT stacks 910, 912, 914, 916, each capable of accessing networks of different RAT types. Although four RAT stacks 910, 912, 914, 916 are shown as an example, the principles of the current disclosure are applicable to WTRUs that include two, three, four, or more RAT stacks. The radio access component 904 may be removably insertable to the WTRU 900 and may be implemented as, for example, a Universal Serial Bus (USB) dongle. Alternatively, the radio access component 904 may be implemented as a component within the WTRU 900.

The four RAT stacks 910, 912, 914, 916 communicate with four corresponding RAT drivers 920, 922, 924, 926 in the WTRU 900. The RAT drivers 920, 922, 924, 926 communicate with corresponding RAT interfaces 930, 932, 934, 936 in the MMF 906. The RAT interfaces 930, 932, 934, 936 communicate with the mobility policy module 940 in the MMF 906. The mobility policy module 940 communicates with the network connection controller module 976 and the user interface module 978 in the WTRU 900. The mobility policy module 940 additionally communicates with a number of interfaces to higher layers, including the Voice Call Continuity (VCC) interface 950, the Session Initiation Protocol (SIP) interface 952, the transport layer interface 954, the Mobile IP (MIP) interface 956, and the multihoming interface 958. The mobility policy module 940 may also communicate with additional higher layer interfaces (not depicted).

Upper layer link layer component 908 includes a number of modules for implementing upper layer (layer three and above) functionality. VCC client module 962 communicates with the VCC interface 950 in the MMF 906 as well as to the SIP module 964. The SIP module 964 additionally communicates with the SIP interface 952 and the transport layer module 966. Transport layer module 966 may implement transport layer protocols such as Transmission Control Protocol (TCP), User Datagram Protocol (UDP), Stream Control Transmission Protocol (SCTP), Datagram Congestion Control Protocol (DCCP), and/or other transport layer protocols. Transport layer module 966 communicates with transport layer interface 954, as well as MIP module 968, IP module 974, and MHF 972. MIP module 968 implements MIP and communicates with MIP interface 956. MHF 972 may be separately connected to IP module 974 or may be implemented in conjunction with IP module 974. MHF 972 communicates with multihoming interface 958. Multihoming interface 958 functions as an adaptation layer. It converts and transfers information between the mobility policy module 940 and the MHF 972. The multihoming interface 958 receives link layer information from all of the RAT stacks 910, 912, 914, 916 that are in communication with the MMF 906.

Multihoming interface 958 may be implemented differently according to the technologies and protocols used at the MHF 972 and MMF 906. The communication of messages between the multihoming interface 958 and the MHF 972 may be implemented as a language-specific or language-independent Application Programming Interface (API) or other protocol. Table 1 and Table 2 show an example API describing communications between an MMF 906 that implements MIH functionality and an MHF 972 that implements Shim6 functionality.

TABLE 1

| Message Received At MMF | Message Sent From MMF To MHF |
|---|---|
| MIH_Link_Going_Down | Shim6_Link_Going_Down |
| MIH_Link_Down | Shim6_Link_Down |
| MIH_Link_Detected | Shim6_Link_Detected |
| MIH_Link_Up | Shim6_Link_Up |
| N/A | Shim6_Register |

The "Message Received At MMF" column of Table 1 indicates MIH messages that may be received at an MMF 906 and provided to the multihoming interface 958. The multihoming interface 958 receives an MIH message, generates the corresponding message in the "Message Sent From MMF To MHF" column, and communicates the generated message to the MMF 906. MIH messages may be received by the MMF 906 at a SAP such as an MIH_LINK_SAP, MIH_NET_SAP, or MIH_SAP, or via a different interface.

In response to a Shim6_Link_Going_Down message, the MHF 972 analyzes if the message relates the current active link. If so, the MHF 972 may adjust timer parameters to speed up triggering of the Locator Pair Exploration procedure sooner. If the message indicates a high confidence that the link is going down, the MHF 972 may stop the keepalive timer and send a keepalive message immediately. If the message indicates a low confidence that the link is going down, the MHF 972 may reduce the keepalive timer to half of its value. If the link described in the message is not the current active link, the MHF 972 removes the link from consideration for the Locator Pair Exploration. In response to a Shim6_Link_Down message, the MHF 972 immediately begins the Locator Pair Exploration procedure. In response to a Shim6_Link_Detected message, the MHF 972 adds the new link as a high-priority candidate for the Locator Pair Exploration procedure. If the currently active link is experiencing problems, the MHF 972 may immediately attempt to establish a new IP link. To determine if the currently active link is experiencing problems, the MHF 972 may analyze one or more QoS parameters, and/or compare one or more QoS parameters to a threshold. In response to a Shim6_Link_Up message, the MHF 972 begins the Locator Pair Exploration procedure. A Shim6 Register message is not generated in response to an MIH message, but is generated when the MMF 906 activates in order to establish communications between the MMF 906 and the MHF 972. This Shim6_Register messages provides information required by the MHF 972 to establish communications with the MMF 906. In response to the Shim6_Register message, the MHF 972 may call a callback function at the MMF 906.

Table 2 shows messages that may be sent from the MHF 972 to the multihoming interface 958 according to the example API.

TABLE 2

| Event At MHF | Message Sent From MHF To MMF |
| --- | --- |
| MHF determines additional communication resources are required | Shim6_LinkUpReq |
| MHF determines determines to deregister from MMF | Shim6_Unregister |
| MHF determines error has occurred | Shim6_Unregister |

The "Event At MHF" column describes events that occur at the MHF 972. In response to the events, the MHF 972 generates the corresponding message in the "Message Sent From MHF To MMF" column, and communicates the generated message to the multihoming interface 958.

The MHF 972 may communicate a Shim6_LinkUpReq message based on a determination that additional communications resources (such as a new IP address and/or new radio interface) are required for the purpose of increasing available bandwidth. In response to the Shim6_LinkUpReq message, the MMF 906 may select and turn on an inactive radio interface. Alternatively or additionally, the MMF 906 may initiate the allocation of a new IP address for the WTRU 900. The MMF 906 may communicate with lower layer link layer components in order to active additional radio interfaces by using, for example, a media-dependent MIH_LINK_SAP interface. The MMF 906 may use, for example, an MIH Link_Action.request message to activate an inactive radio interface. When the MHF 972 has determined to deregister from the MMF 906 or when an error has occurred in the MMF 972, the MHF 972 may communicate a Shim6_Unregister message to the multihoming interface 958. In response to the Shim6_Unregister message, the MMF 906 removes any entries or other data corresponding to the MHF 972, terminating communications between the MMF 906 and the MHF 972.

Figure 10:
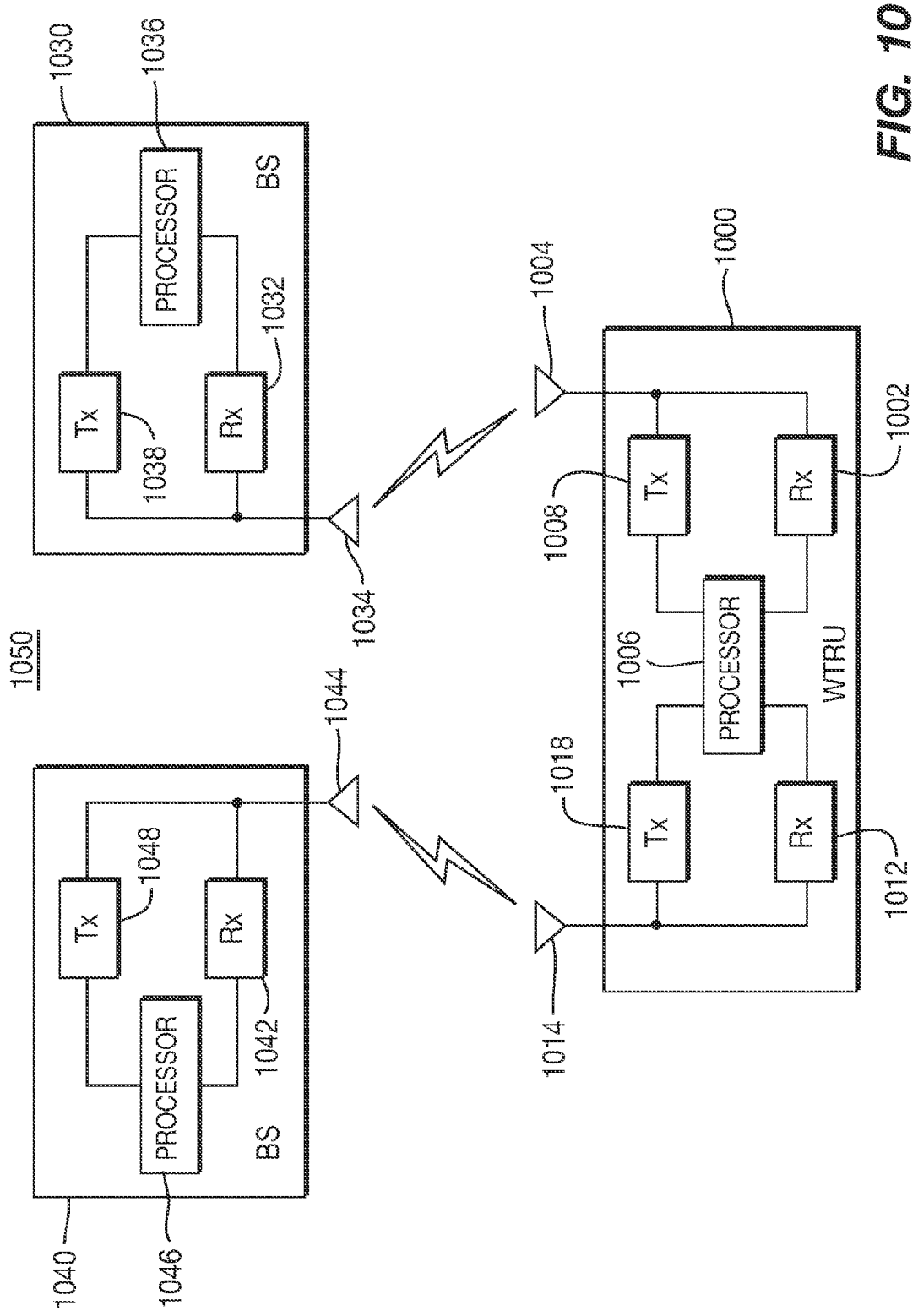
FIG. 10 is a conceptual block diagram of a wireless communication system capable of implementing the features described with reference to FIGS. 5-9.

FIG. 10 shows an example wireless communication system 1050 capable of implementing the features and elements described above with reference to FIGS. 5-9. The wireless communication system 1050 includes a WTRU 1000 capable of communicating with a first base station (BS) 1030 that implements a first RAT and with a second base station 1040 that implements a second RAT.

The WTRU 1000 includes a processor 1006 in communication with a first transmitter 1008, first receiver 1002, and first antenna 1004. The first transmitter 1008, first receiver 1002, and first antenna 1004 are configurable to implement the first RAT. The processor 1006 is also in communication with a second transmitter 1018, second receiver 1012, and second antenna 1014. The second transmitter 1018, second receiver 1012, and second antenna 1014 are configurable to implement the second RAT. The processor 1006 is configurable to generate, encode, and decode messages and signals as described above with reference to FIGS. 5-9, and is configurable to operate and/or direct a multihoming function (not depicted) and a mobility management function (not depicted) to implement functionality as described above with reference to FIGS. 5-9. The transmitters 1008, 1018 and receivers 1002, 1012 are configurable to send and receive, respectively, messages and signals as described above with reference to FIGS. 5-9. The first transmitter 1008 and first receiver 1002 may be implemented as a transceiver, and/or the second transmitter 1018 and second receiver 1012 may be implemented as a transceiver. The WTRU 1000 may also include additional transceivers (not depicted) and/or transmitter/receiver pairs (not depicted) in communication with the processor 1006 capable of communicating according to additional diverse RATs. Alternatively or additionally, the WTRU 1000 may include one or more transceivers (not depicted) in communication with the processor 1006, each of the one or more transceivers capable of communicating using more than one RAT per transceiver.

The first base station 1030 includes a processor 1036 in communication with a transmitter 1038, receiver 1032, and antenna 1034. The second base station 1040 includes a processor 1046 in communication with a transmitter 1048, receiver 1042, and antenna 1044. The processors 1036, 1046 are configurable to generate, encode, and decode messages and signals as described above with reference to FIGS. 5-9. The transmitters 1038, 1048 and receivers 1032, 1042 are configurable to send and receive, respectively, messages and signals as described above with reference to FIGS. 5-9. The first base station 1030 and/or second base station 1040 may include a remote MIHF (not depicted). Alternatively or additionally, the first base station 1030 and/or second base station 1040 may communicate data between the WTRU 1000 and a remote MIHF implemented in a network node in a core network to which the first base station 1030 and/or second base station 1040 is connected.

RATs which may be implemented in the WTRU 1000 and base stations 1030, 1040 include but are not limited to technologies such as: Institute of Electrical and Electronics Engineers (IEEE) Wireless Local Area Network (WLAN) 802.11x; Code Division Multiple Access 2000 (CDMA2000); Universal Mobile Telecommunications System (UMTS); UMTS Radio Access Network (UTRAN); Wideband Code Division Multiple Access (WCDMA); Worldwide Interoperability for Microwave Access (WiMAX); Global System for Mobile Communications (GSM); GSM Enhanced Data Rates For GSM Evolution (EDGE) Radio Access Network (GERAN); Wireless Broadband (WiBro); Long Term Evolution (LTE); Evolved UTRAN (EUTRAN); and LTE Advanced.

Although features and elements are described above in particular combinations, each feature or element as described above with reference to FIGS. 5-10 can be used alone without the other features and elements or in various combinations with or without other features and elements. The sub-elements of the methods and features described above with reference to FIGS. 5-10 may be performed in any arbitrary order (including concurrently), in any combination or sub-combination. The features and elements described above with reference to FIGS. 5-10 may be implemented in a computer program, software, or firmware incorporated in a computer-readable storage medium for execution by a general purpose computer, a specific-purpose computing or data processing device, and/or one or more processors. Suitable computer-readable storage media include but are not limited to a register, a cache memory, a read-only memory (ROM), a semiconductor memory device such as a Dynamic Random Access Memory (D-RAM), Static RAM (S-RAM), or other RAM, a magnetic medium such as a flash memory, a hard disk, a magneto-optical medium, an optical medium such as a CD-ROM, a digital versatile disk (DVDs), or Blu-Ray disc (BD), other volatile or non-volatile memory. Suitable processors include but are not limited to a single- or multi-core general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, an integrated circuit (IC), a system-on-a-chip (SOC), and a state machine.

The multihoming functions and mobility management functions described above with references to FIGS. 5-10 may be implemented as one or more software modules, one or more processors, or as combinations thereof. Suitable software modules include, by way of example, an executable program, a function, a method call, a procedure, a routine or sub-routine, one or more processor-executable instructions, a script or macro, an object, or a data structure.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU), the WTRU comprising:
    a first link layer component configured to implement a first radio access technology (RAT);
    a second link layer component configured to implement a second RAT;
    a multihoming function; and
    a mobility management function in communication with the first link layer component and the second link layer component, configured to receive link status information from the first link layer component and to communicate the link status information to the multihoming function;
    wherein the multihoming function is configured to shorten a duration of a link failure detection timer parameter based on the link status information indicating that conditions on a link are degrading.

2. The WTRU of claim 1 wherein the multihoming function is configured to remove a link from a list of path exploration candidates at the multihoming function based on the link status information indicating that conditions on the link are degrading.

3. The WTRU of claim 1 wherein the multihoming function is further configured to initiate a path exploration procedure in response to the link status information indicating that a currently active link is down.

4. The WTRU of claim 1 wherein the multihoming function is further configured to add a new link to a list of path exploration candidates based on the link status information indicating that the new link has been discovered.

5. The WTRU of claim 1 wherein the multihoming function is configured to initiate a path exploration procedure in response to the link status information indicating that a link is available for use.

6. The WTRU of claim 1 wherein the mobility management function is configured to communicate using an IEEE Media Independent Handover (MIH) protocol.

7. The WTRU of claim 1 wherein the multihoming function is configured to communicate using an Internet Engineering Task Force (IETF) Shim6 protocol.

8. A method implemented in a wireless transmit/receive unit (WTRU), the method comprising:
    a mobility management function receiving link status information from a link layer component;
    the mobility management function communicating the link status information to a multihoming function; and
    the multihoming function shortening a duration of a link failure detection timer parameter based on the link status information indicating that conditions on a link are degrading.

9. The method of claim 8 further comprising:
    the multihoming function removing a link from a list of path exploration candidates based on the link status information indicating that conditions on the link are degrading.

10. The method of claim 8 further comprising:
    the multihoming function initiating a path exploration procedure in response to the link status information indicating that a currently active link is down.

11. The method of claim 8 further comprising:
    the multihoming function adding a new link to a list of path exploration candidates based on the link status information indicating that the new link has been discovered.

12. The method of claim 8 further comprising:
    the multihoming function initiating a path exploration procedure in response to the link status information indicating that a link is available for use.

13. The method of claim 8 wherein the mobility management function is configured to communicate using an IEEE Media Independent Handover (MIH) protocol.

14. The method of claim 8 wherein the multihoming function is configured to communicate using an Internet Engineering Task Force (IETF) Shim6 protocol.

* * * * *